Figure 1:
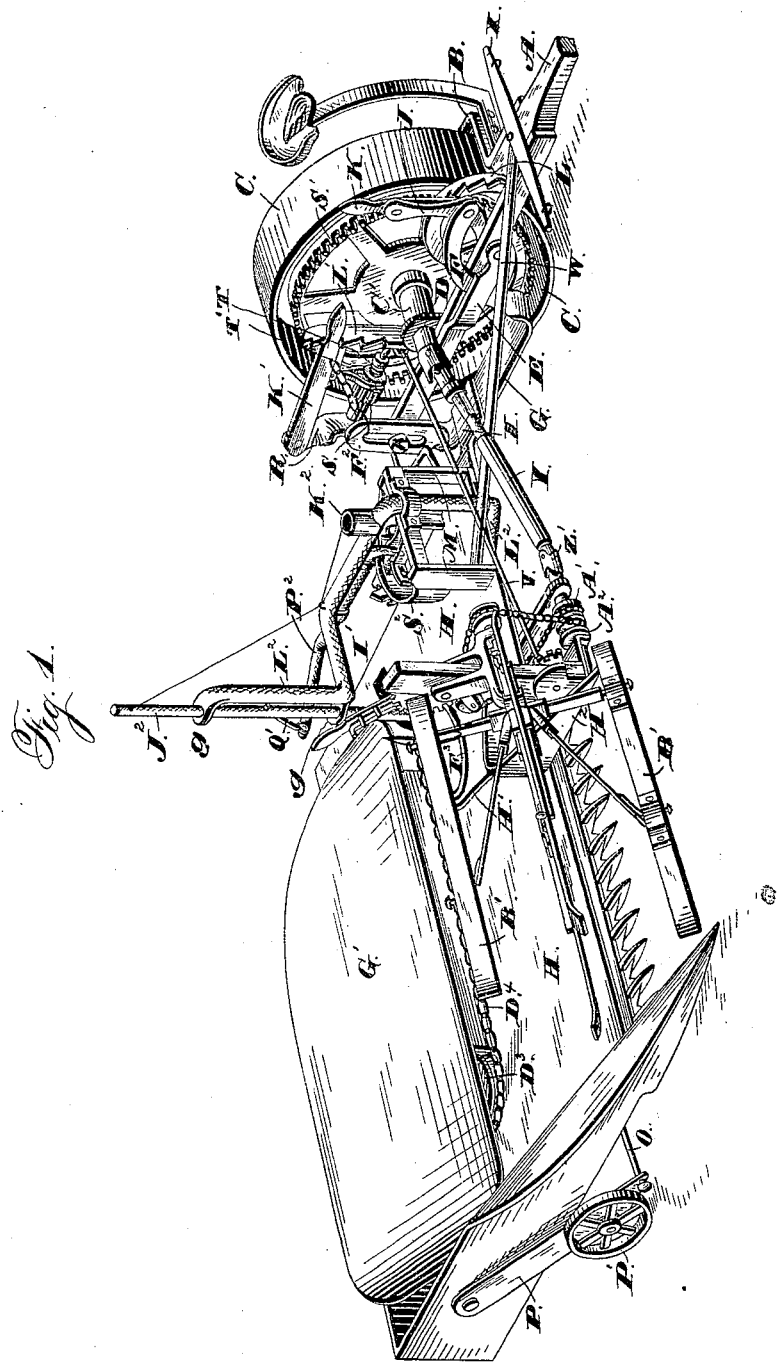

(Model.)

9 Sheets—Sheet 1.

A. O. CARMAN.
COMBINED HARVESTER AND GRAIN BINDER.

No. 269,826. Patented Jan. 2, 1883.

WITNESSES
Jas. E. Hutchinson
S. G. Nottingham

INVENTOR
A. O. Carman
By Leggett & Leggett
Attorney

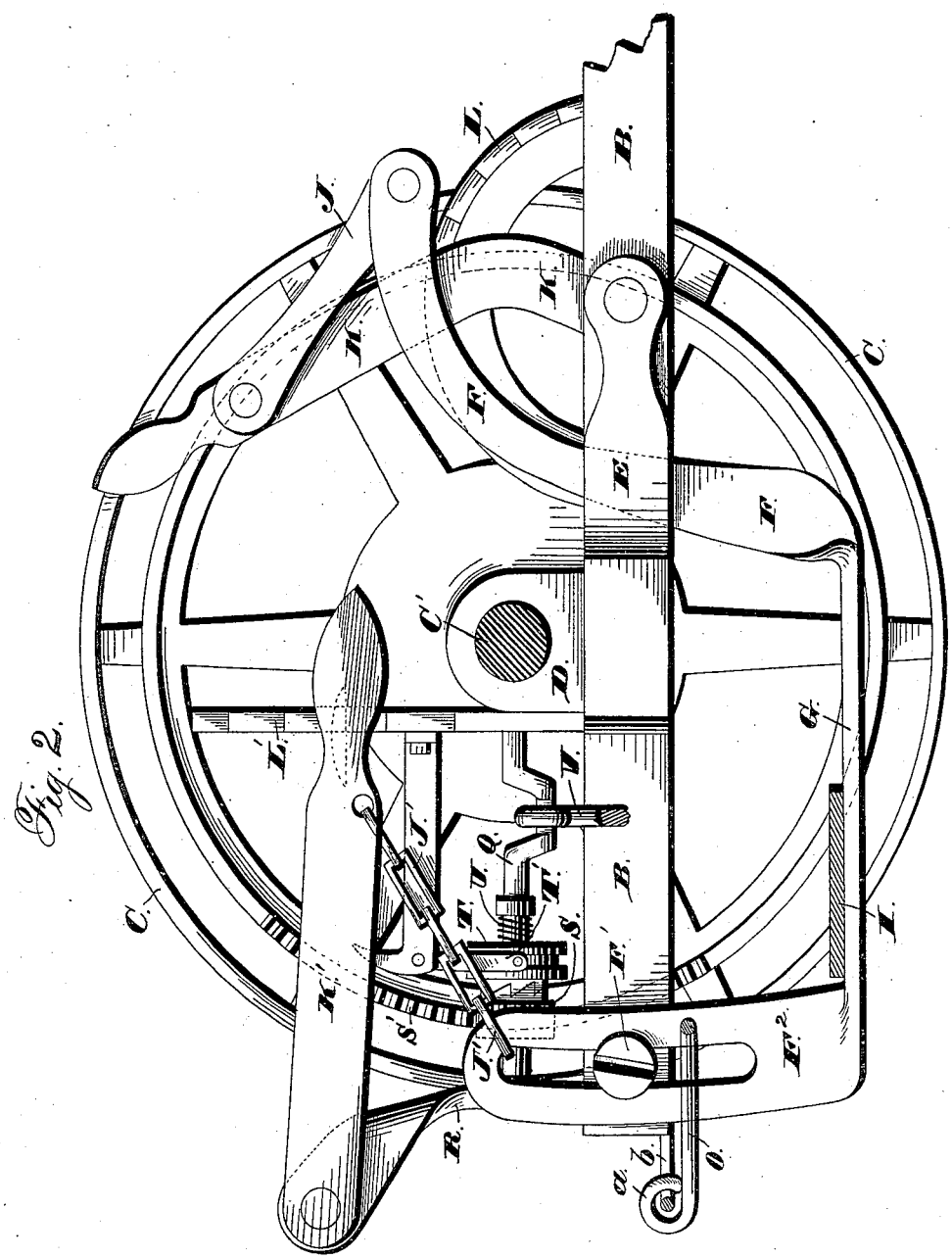

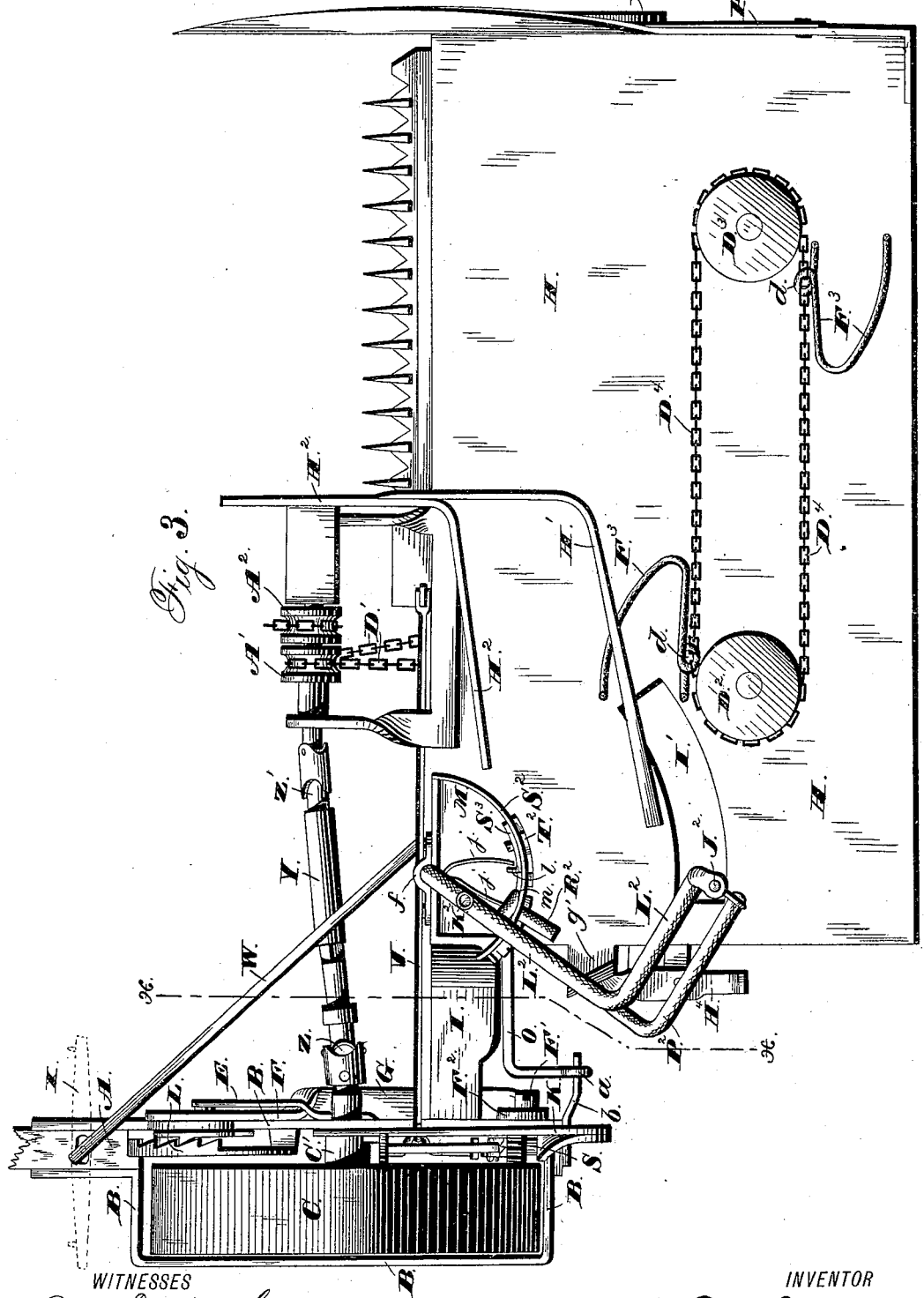

(Model.)
9 Sheets—Sheet 4.
A. O. CARMAN.
COMBINED HARVESTER AND GRAIN BINDER.
No. 269,826.  Patented Jan. 2, 1883.
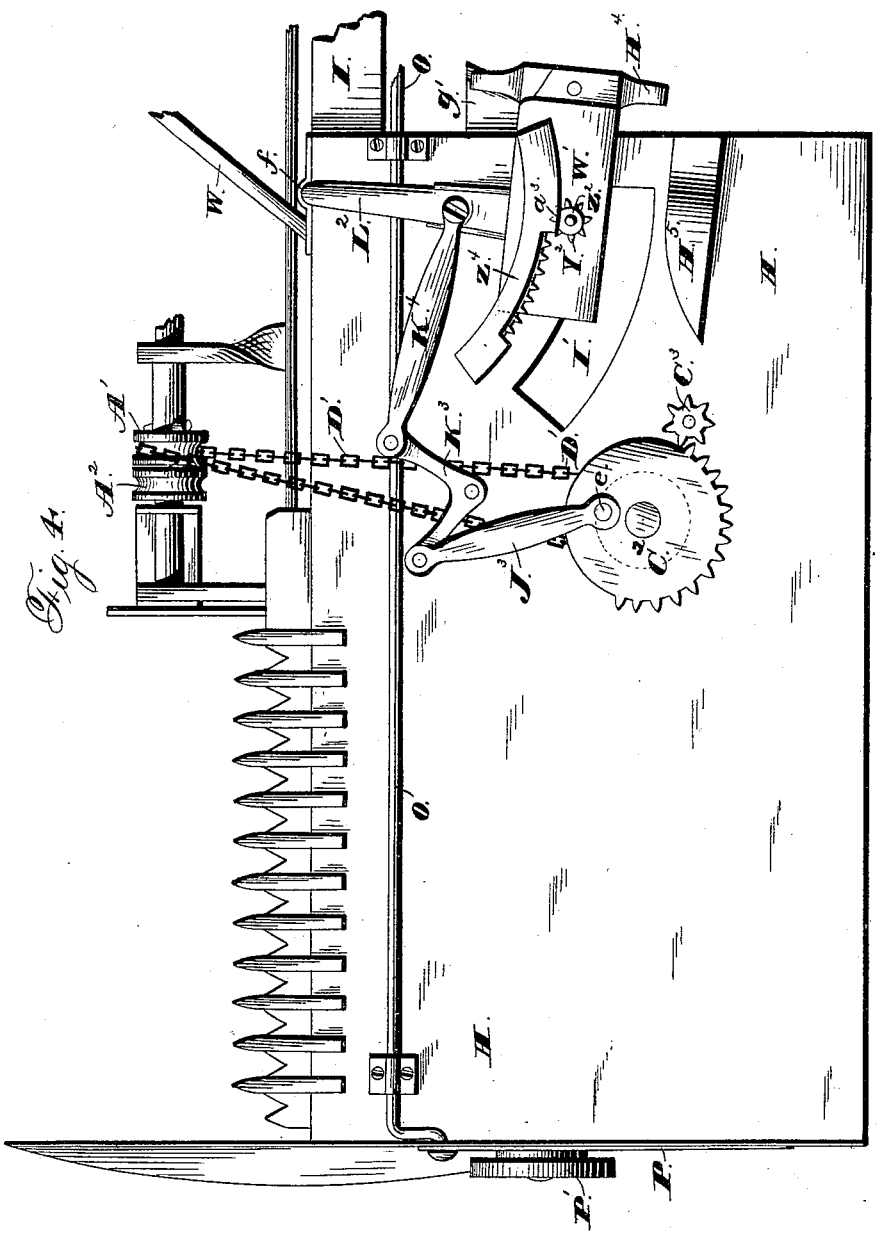
WITNESSES
Jas. E. Hutchinson.
S. G. Nottingham
INVENTOR
A. O. Carman.
By Leggett & Leggett.
Attorney (Model.)
9 Sheets—Sheet 5.
A. O. CARMAN.
COMBINED HARVESTER AND GRAIN BINDER.
No. 269,826.
Patented Jan. 2, 1883.
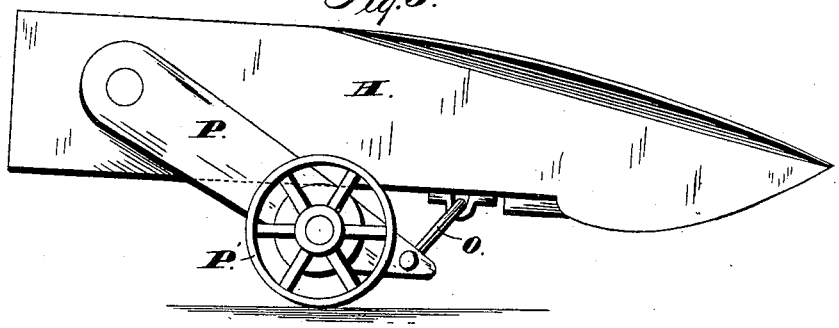
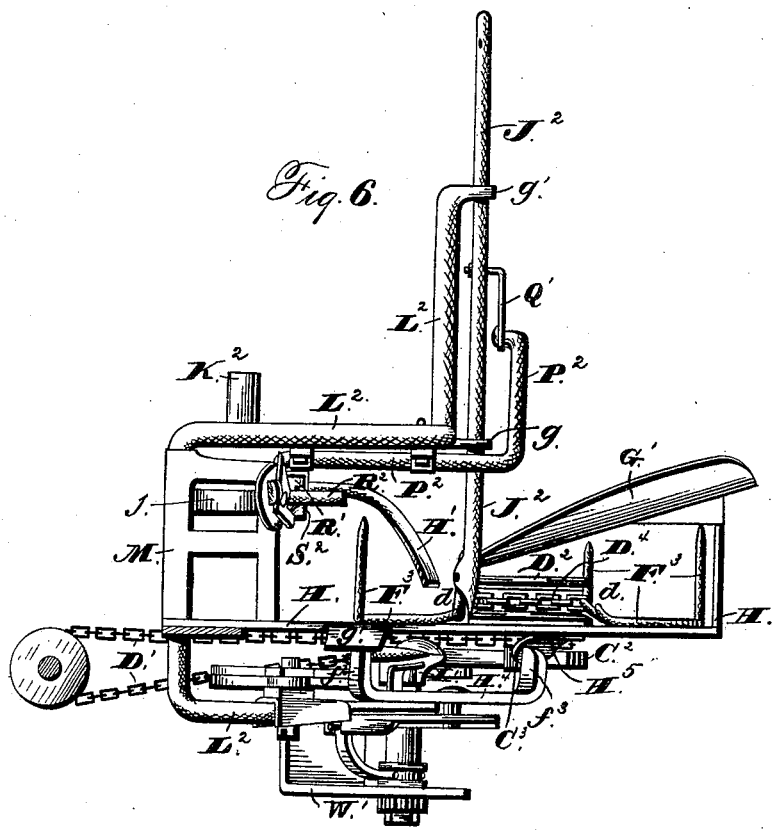
WITNESSES
Jas. E. Hutchinson.
S. G. Nottingham.
INVENTOR
A. O. Carman.
By Leggett & Leggett
Attorney (Model.)
9 Sheets—Sheet 6.
A. O. CARMAN.
COMBINED HARVESTER AND GRAIN BINDER.
No. 269,826. Patented Jan. 2, 1883.
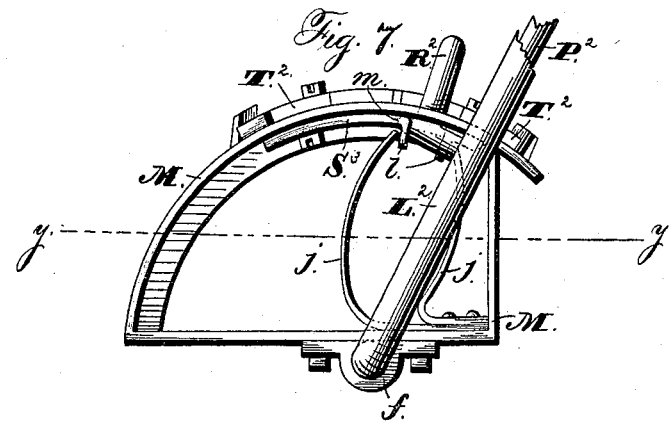
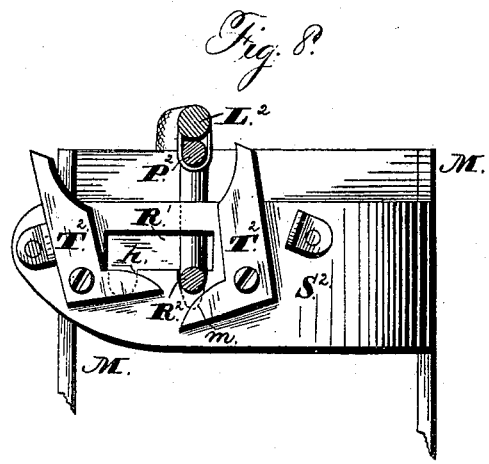
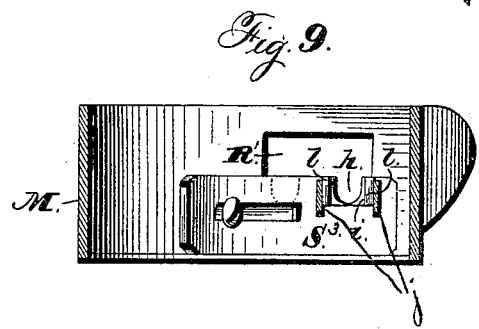
WITNESSES
Jas. E. Hutchinson.
S. G. Nottingham.
INVENTOR
A. O. Carman.
By Leggett & Leggett,
Attorney (Model.) A. O. CARMAN.
COMBINED HARVESTER AND GRAIN BINDER.
No. 269,826. Patented Jan. 2, 1883.
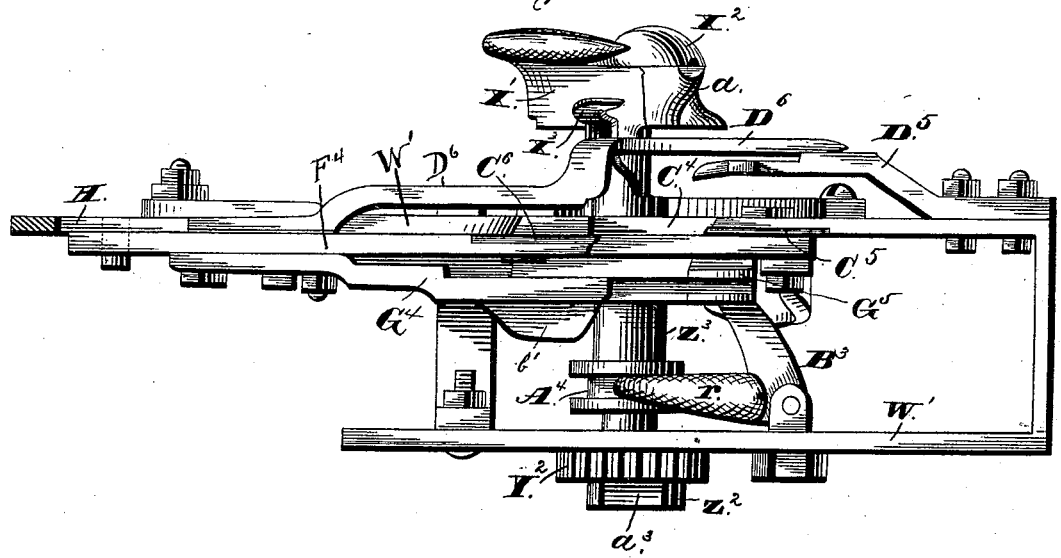
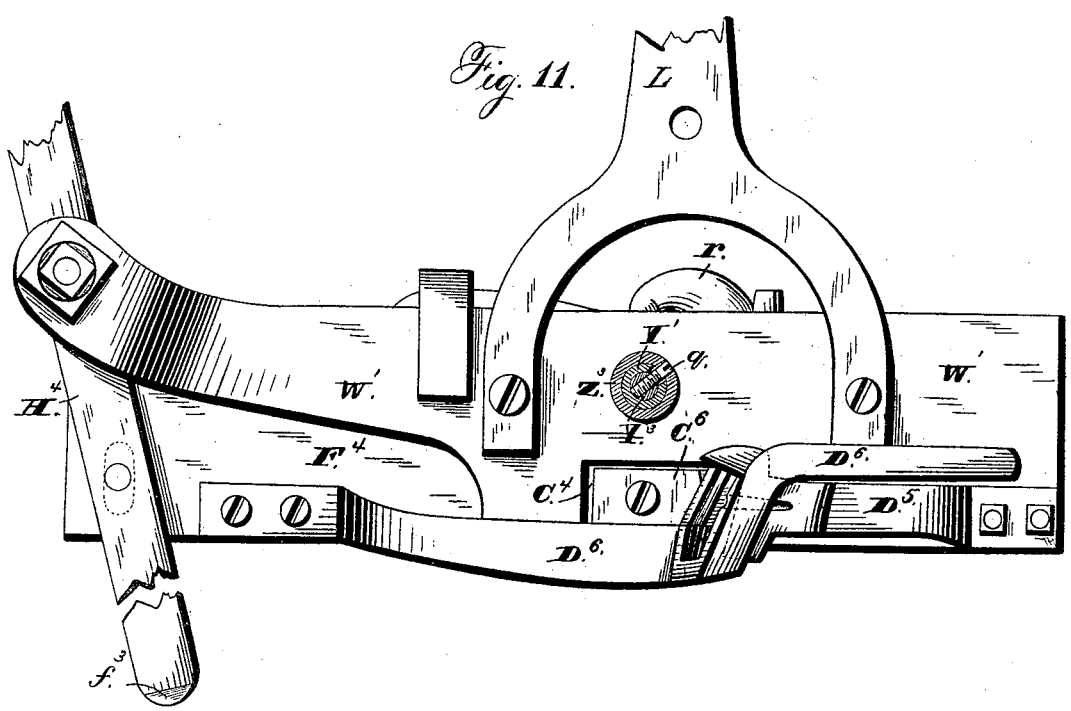
WITNESSES
Jas. E. Hutchinson.
S. G. Nottingham.
INVENTOR
A. O. Carman.
By Syggatt & Syggatt
Attorney.

(Model.)
9 Sheets—Sheet 8.
A. O. CARMAN.
COMBINED HARVESTER AND GRAIN BINDER.
No. 269,826. Patented Jan. 2, 1883.
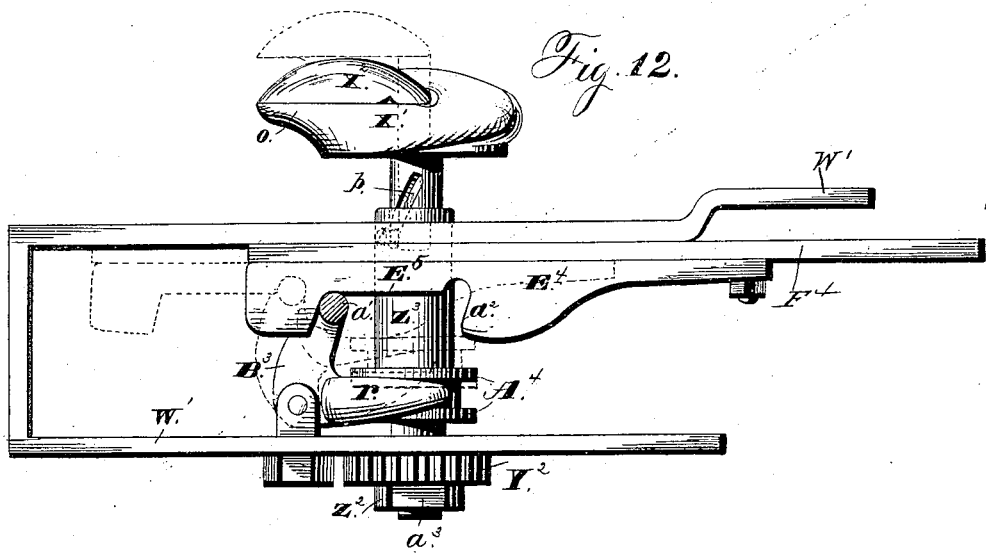
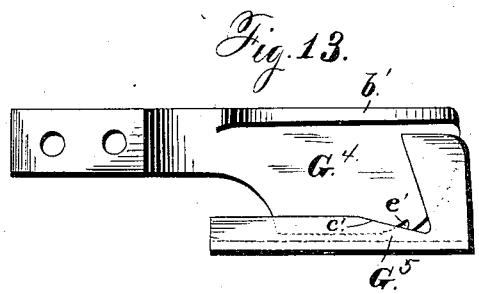
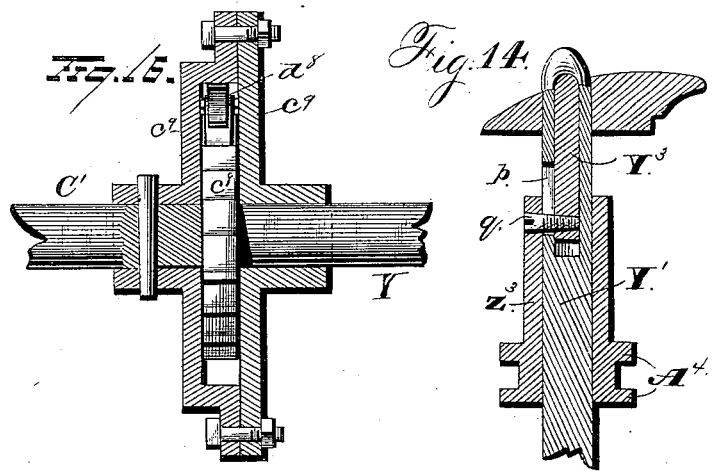
WITNESSES
Jas. E. Hutchinson.
S. G. Nottingham.
INVENTOR
A. O. Carman.
By Leggett & Leggett
Attorney (Model.) A. O. CARMAN. 9 Sheets—Sheet 9.
COMBINED HARVESTER AND GRAIN BINDER.
No. 269,826. Patented Jan. 2, 1883.
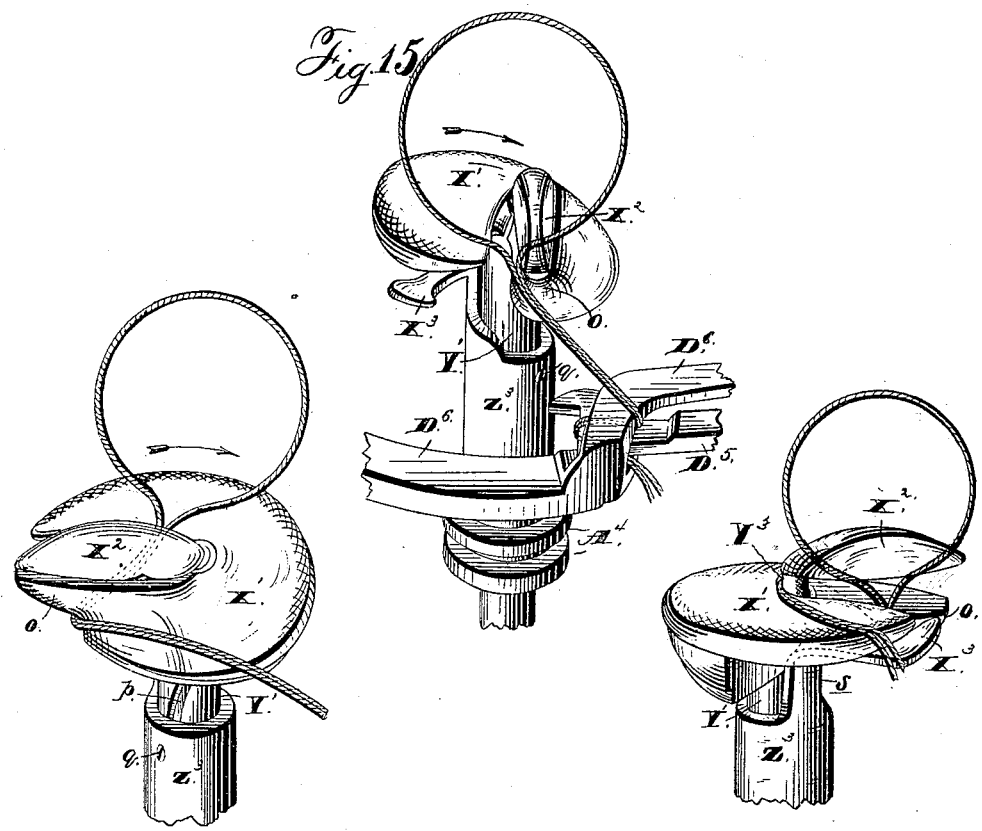
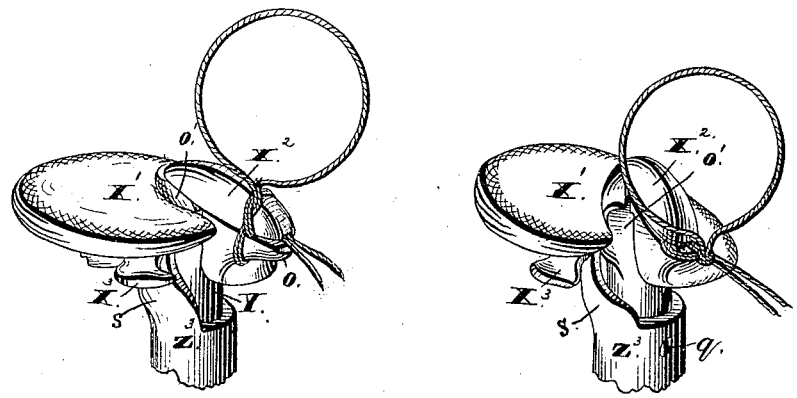

UNITED STATES PATENT OFFICE.

ALVIN O. CARMAN, OF POTTERVILLE, MICHIGAN.

COMBINED HARVESTER AND GRAIN-BINDER.

SPECIFICATION forming part of Letters Patent No. 269,826, dated January 2, 1883.

Application filed May 5, 1882. (Model.)

*To all whom it may concern:*

Be it known that I, ALVIN O. CARMAN, of Potterville, in the county of Eaton and State of Michigan, have invented certain new and useful Improvements in a Combined Harvester and Grain-Binder; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in a combined grain-binder and harvester; and it consists in certain features of construction and combinations of parts, as will be hereinafter described, and pointed out in the claims.

In the accompanying drawings, Figure 1 is a perspective view of my improved harvester and binder. Fig. 2 is a sectional view of the machine, showing the inner face of the ground-wheel and adjacent parts. Fig. 3 is a plan view with the shield removed, showing the endless carrier, compressor-arm, &c. Fig. 4 is a reversed plan view. Fig. 5 is an end view, showing the grain-wheel. Fig. 6 is a sectional view on the lines $x\ x$ of Fig. 3, showing the binding-arm or needle, needle-carrier, and the connection of the needle-carrier with the knot-tying mechanism. Fig. 7 is an enlarged plan view of the needle-operating stand. Fig. 8 is a rear elevation of the same. Fig. 9 is a section of the same on line $y\ y$ of Fig. 7. Fig. 10 is a rear elevation of the knot tying and cutting mechanism. Fig. 11 is a top plan of the same with the tying-bill removed. Fig. 12 is a front elevation of the same. Fig. 13 is an enlarged detached view of the cord-holding mechanism. Fig. 14 is a vertical sectional view of the tying-bill and sleeve, and Fig. 15 shows the knot-tying bill in five different positions it assumes while tying the cord. Fig. 16 is a detached view of the pawl-and-ratchet devices connected with the shaft Y and axle C'.

A represents the draft-tongue, the rear end of which is provided with a suitable frame, B, adapted to embrace the ground-wheel C, and provide pivotal support for several levers, the functions of which will be hereinafter described. This frame B is provided with the bearings D, in which the wheel C is journaled, and is also provided on its inner face with the clasp E, which is adapted for the passage of the arm F, and also with the screw or guide pin F', adapted to rest in the oblong slot of the arm $F^2$, and holds the same in position. These arms F and $F^2$ are upward extensions of the step G, which latter forms the support for the table H through the intervention of the cross-bar I. The extreme upper end of the arm F is connected by the link J to the lever K, which latter is adapted to engage the segment-rack L, and the upper end of the arm $F^2$ is connected to the lever K' by the chain J'. This lever K' is adapted to engage with the vertical rack L', and be held in an elevated or depressed position, and consequently hold the said table H in a correspondingly elevated or depressed position. By moving the lever K forward the front end of the table H is inclined downward, and by reversing the motion the front end of the table is elevated. This construction enables me to cut nearer to or farther from the ground, as circumstances may require.

The table H is provided on its under side with the pivoted crank-shaft O, which latter is connected on the grain side of the machine to the pivoted arm P, the latter having the grain-wheel P' thereon. The shaft O projects beyond the said table at its opposite end, where it is bent and provided with a ring, $a$. This ring $a$ receives the end of the bent pin $b$, the latter being secured to the frame B, and as the table is elevated or lowered by the lever K' the said pin $b$ engages the ring $a$ and turns the shaft O, which latter in turn elevates or lowers the arm P, with its attached wheel P', and consequently keeps the latter in the same relative plane with the ground-wheel.

Q is a crank-shaft, one end of which is journaled in the vertical rack or standard L', while the opposite end thereof is journaled in the arm R. This shaft Q is provided near its rear end with a loose pinion, S, adapted to engage with and be operated by the annular gearing S', rigidly secured on the inner face of the ground-wheel C. This pinion S is allowed to revolve on the shaft Q, but is allowed no longitudinal movement thereon, and hence it is constantly in engagement with the annular gear S'. This pinion S is provided on its front face with ratchet-teeth, which latter are adapted to engage with a corresponding serrated face of the sliding clutch T. This clutch T is moved longitudinally on the shaft Q by the lever T', but is prevented from turning independently thereof by means of a blind key or equivalent means, and is held up in position against and in engagement with the pinion S by the spring U. When the machine is moving forward the annular gear S' engages with the pinion S, which in turn engages the clutch T and turns the crank-shaft and operates the harvester-cutters; but when the machine is moved backward the annular gear S' engages the pinion S and turns the same in the opposite direction; but the inclination of the teeth on the adjacent faces of the pinion and clutch is such that they will be forced apart without turning the crank Q. Just as soon, however, as the forward motion of the machine is again commenced, the spring U throws the clutch and pinion into engagement, thus turning the shaft Q, which in turn operates the harvester-cutters. The harvester-cutters are connected to the crank-shaft Q by the pitman V in the ordinary manner.

W is a diagonal brace connecting the table H to the tongue A. The rear end of this brace is rigidly connected to the table, while the front end thereof rests loosely above an oblong slot in the tongue A, and is provided at this point with an opening for the passage of the whiffletree-bolt, which latter passes downward through the oblong slot in the tongue A, and is secured therein against displacement. The whiffletree X can be secured to this bolt above the brace W or between the said brace and tongue, and thus it will be seen that as the draft is applied to the machine the oblong slot allows the diagonal brace to have a limited play when the table is rocked or raised, and thus to take the greater part of the strain.

The ground-wheel C is rigidly secured to the axle C', which latter is journaled in the boxes D. The inner end of this axle C' is connected to the shaft Y by gimbal-joints Z Z', the said shaft also being provided with pawl-and-ratchet arrangement, so as to enable the machine to be moved backward without operating the reel and binder mechanism. The end of the axle C' (see Fig. 16) is provided with a disk, $c^8$, formed with ratchet-teeth, and the axle and shaft are connected by a two-part coupling or casing consisting of the collars $c^9 c^9$, bolted together and to the shaft Y, and inclosing the ratchet-disk $c^8$ of the axle. The coupling is also provided with a spring-pawl, $d^3$, adapted, when the machine is at work, to engage one of the ratchet-teeth to hold the shaft and ratchet in rigid connection; but the connection allows of the turning of the disk $c^8$ within the casing when the machine is backed, thus throwing the shaft Y out of connection with the axle. The shaft Y is journaled in suitable bearings, and is provided with the two sprocket or pulley wheels A' A², adapted to operate respectively the binder and rake mechanism and the reel. The construction and operation of this reel B', I have made the subject of a separate application, and hence it need not be described here.

The pulley A' is rigidly secured on the shaft Y, and is connected to the combined mutilated gear-wheel and pulley C² by the endless chain D'. This wheel C² is secured on the under side of the table, and is adapted to mesh with the pinion C³, the shaft of which projects up through the table H, and has secured thereto the driving-pulley D². Another pulley or wheel, D³, is situated on the table H a suitable distance from the pulley or wheel D², and around these wheels the endless chain D⁴ winds and moves. This chain D⁴ is provided at suitable distances apart with the rakes F³, made of suitable metal, and adapted to take the grain as it falls on the table and carry it under the compressor-arm. These rakes are bent in horseshoe form, with the two ends thereof turned upward, so as to present a broad surface for the grain. Each rake is also provided with the loop or twist $d$, on the inner side thereof, into which the chain-links are secured, as shown. This construction is simple and enables the parts to be more quickly put together than if the rakes had to be secured to a continuous chain. In this instance the loops $d$ form one link of the chain and form a limited flexible connection between the chain and rake, and thereby enable the said chain to make the necessary short turns without inconvenience or trouble.

The shield G' is constructed of sheet metal or wood, and is adapted to cover the rakes and endless chain, and thereby enable the grain to rest partly thereon without engaging with the rakes on the rear side of the chain, which would carry the grain in the opposite direction from which it is needed.

H' is the spring-metal compressor-arm, bent in the form shown, and secured at its front end to the inner divider, H². This compressor-arm is inclined downward from its front end, (see Fig. 6,) so as to compactly hold the grain at the point where the rakes stop with their load. The rear portion of this compressor-arm rests in a position between the upwardly-extending arms of the rakes and over the opening I', through which the needle passes to carry the cord to the knot-tyer. In the drawings I have only shown two rakes placed equidistant apart on the chain, and they are so arranged, in combination with parts to be hereinafter described, as to stop when the gavel rests over the opening I'. When this part of the operation is reached the needle or binder-arm J² has been elevated, and stands in a vertical position over or nearly over the outer end of the slot I', and the free end of the binding-cord is firmly held in the holder of the tying mechanism, which is also at the outer end of the slot I', and passes up through the opening I', through the eye of the needle, back through suitable tension devices, to the cord-box K². That portion of the cord or twine between the end of the binder-arm or needle J² and the tying mechanism forms a stop or limit for the grain, which becomes firmly compacted between the said cord and rake when the needle and tyer move toward the center of the table H. When the parts are thus moved the needle passes over the gavel, and then (when the inner end of the slot l' has been reached) downward, thus carrying the cord over and around the bundle and within reach of the knot-tyer. The needle and tyer then move together toward the outer end of the slot, and during this movement the tyer is caused to revolve and tie the cord, and the knife to operate and sever the ends thereof, which releases the bundle and allows the same to fall off the table or be ejected therefrom by the needle, which continues its movement while depressed to the extreme outer end of the slot l'.

The mutilated gear-wheel C² is provided with a smooth periphery for a portion of its circumference, while the remaining portion thereof is provided with teeth, with which the pinion C³ engages. This wheel C², while the machine is in operation, is constantly in motion; but the construction of the wheel C² causes the pinion C³ to move intermittently, and consequently only move the rakes, so that they will stop when they reach the proper position, before described, until the mutilated portion of the wheel C² is passed and the teeth of the two wheels are again in engagement.

All the parts are constructed and placed so that they will begin and end their movements at the proper time, and as this lies partly within the province of the mechanic no special detailed description of the construction of the several parts will be given other than to enable the construction and operation of the machine to be clearly understood.

The gear-wheel C² is provided on its lower face, about midway the mutilated portion thereof, with a crank-pin, $e$, to which one end of the lever J³ is connected. The opposite end of this lever J³ is connected to one end of the bell-crank K³, the latter being pivoted to the under side of the table H. The opposite arm of this bell-crank K³ is connected, through the intervention of the link K⁴, to the horizontal portion of the needle-carrier L² under the table H. The horizontal portion of the needle-carrier L² above the table H carries and directs the needle, while the horizontal portion thereof below the table carries the knot-tying mechanism, and as the parts of this carrier between these two horizontal portions are rigidly connected together it follows that the needle and knot-tying mechanism will move simultaneously and at all times be in the same relative position. As the wheel C² is constantly moving, it follows that the needle-carrier L², with its attached parts, is also constantly in motion, and this constant movement of the carrier, together with parts hereinafter to be described, operates to elevate and lower the needle and turn and operate the several parts of the tying mechanism. The needle-carrier L² is supported and held in its proper position by the vertical portion thereof, which is journaled in suitable boxes, $f$, secured respectively to the table H and to the stand M.

K² is the twine-box, rigidly secured on the top of the needle-carrier L². This box can be of any ordinary construction best suited for the purpose. That portion of the needle-carrier L² above the stand M is first carried horizontally backward toward the rear of the machine a suitable distance, is then curved horizontally inward toward the table H for a suitable distance at right angles to the remaining horizontal portion, and then vertically upward for the remaining portion of its length. The upper and lower extremities of this latter vertical portion are provided with the bearings $g$, in which the needle moves, and by which it is held in its vertical position. The needle J² is connected between these bearings $g$ to the needle-operating lever P² by the link Q'. This operating-lever P² is pivotally secured to the under side of the needle-carrying arm L², and conforms somewhat in shape thereto. The outer rear end, as before stated, is connected to the needle through the intervention of a link, while the front end thereof is curved downward, and then horizontally rearward for a short distance to form a crank, R².

The rear face or plate, S², of the stand M is formed in the arc of a circle concentric with the axis of the needle-carrier, and is provided with the slot R', in which the crank R² of the operating lever P² works. This slot is of suitable length, and is provided at its opposite extremities with the downward extension or vertical portion $h$, in which the crank R² falls, so as to enable the operating-lever to turn. It is necessary to provide means for elevating the said crank above these downward continuations, and to provide means for preventing the crank from again entering them before the proper time; and to do these things I have provided a longitudinally-sliding bridge, S³, adapted to be moved so as to cut off these continuations as soon as the crank has been lifted therefrom. This bridge S³ is provided with an open slot, $i$, adapted to register first with one downward continuation $h$ of the slot R' in the face-plate of the stand M, and then with the other, so as to enable the crank R² to enter the said slots at the proper time. This bridge S³ is suitably supported on the concave face of the stand M, and is provided with an inward projecting lug, $l$, on each side of the slot $i$, against which suitable springs, $j$, bear, the tendency of which springs is to keep the slot $i$ in the said bridge S³ between the two downward portions of the slot R', and thereby close the said downward continuation of the said slot R' and form a straight smooth floor thereto. This bridge S³ is moved in the proper directions by the downwardly-projecting finger $m$ of the crank R², which rests between the projecting lugs $l$, and consequently causes the bridge to move simultaneously and in the same direction with the needle-operating lever. Now, as the needle-operating lever is moved by the needle-carrier first in one direction and then in another, it follows that the crank will first fall in the downward continuation at one end, and then go through the same movement at the opposite end, and to elevate the crank from these downward continuations or vertical portions of the slot R', I have provided the two L-shaped levers T² and secured them to the outer face of the plate S² with the short arms immediately under the vertical portions of the slot R'. When the crank has dropped into one of the vertical portions of the slot R' the needle-carrier still continues its motion for a short distance, during which it bears against the long arm of the L-shaped lever T², which moves the crank upward out of the vertical portion of the slot. As soon as the crank is elevated out of the vertical slot the bridge S³ is caused to move so as to cover the said slot, and thereby enable the crank to move safely over the same to the other side of the horizontal portion of the slot R'. This movement of the crank R² in the vertical slots turns the needle-operating lever, which in turn moves the needle up and down. When the crank has been lifted from the vertical slot nearest the center of the machine it holds the needle depressed and causes it to move in the slot I', with the eye of the same below the table H, until the opposite vertical slot is reached. When the crank is turned in the opposite direction it elevates the needle, and thereby enables it to move in an elevated position over the gavel toward the center of the table H.

The needle J² can be made of any suitable metal and of any suitable shape best suited for the purpose in view.

The horizontal portion of the needle-carrier beneath the table H is provided on its outer end with a suitable box, W', in which the tying mechanism is placed and in which it operates. This tying mechanism, as before stated, moves simultaneously with the needle, and is situated under the slot I' in such a position as to take the cord as it is brought down by the needle. This tying mechanism consists of a tying-bill, X', with its grasper X² and bridge X³, cord or twine holders, and cutting-knives, which sever the cord while the knot is being tied, the cord in the meanwhile being held by the holders situated above the cutting knives. The tying-bill X' is made of any suitable metal, and is rigidly secured to the upper end of the shaft Y', the lower end of the said shaft being provided with a pinion, Y², which engages with a stationary segment-rack, Z², secured in any suitable manner below the table H. A more precise description of the rack will be given farther on in the specification. The tying-bill is approximately circular in form, and is provided with the rigid jaw o, which, together with the grasper X², firmly hold between them the two ends of the string after the same has been severed, and with the recess or opening o' through which the cord first passes. The under face of the jaw o is curved, as shown in the drawings, so as to direct the cord to the top to the tying-bill as the tyer revolves by means of the pinion segmental rack before referred to. The cord as it is carried down by the needle rests in the recess or opening o', and, as the tying-bill revolves in the direction shown by the arrows, Fig. 15, the cord is carried to the under side of the jaw, o, and is then caused by the peculiar curvature of the said jaws, on the under side thereof, to pass to the top of the tying-bill. The grasper X², during this operation, rises slightly, and the shank thereof forms a stop for the cord, and prevents it from sliding off the curved face of the bill and directs it to its proper position. The top face of the tying-bill is gradually inclined from the under side of the jaw o to the point thereof on the opposite side of the slot, which point rests in the same or a slightly-elevated plane above the jaw o. Now, the continued partial rotation of the bill carries the cord under the grasper X², which then descends and firmly holds the ends of the cord. While this operation was going on the knives had severed the cord and left the gavel to be ejected by the needle J. The upper end of the shaft Y' is hollow for the reception of the shank Y³ of the grasper X², and the center of the tying-bill is perforated for the passage of this shank. The shell of the shaft Y' is provided near its upper end with an inclined slot, p, through which a set-screw, q, passes, the inner end of this set-screw being secured in the shank Y³.

A sleeve, Z³, is secured in the box W' around the central portion of the shaft Y', and is provided with the grooved collar A⁴, in which the arms r of the pivoted bell-crank lever B³ rest. The sleeve Z³ is also provided with a perforation for the passage of the set-screw q. This sleeve Z³ is provided at its upper end with an arm, s, which latter terminates in a bridge, X³, adapted to rise with the sleeve Z³, when the latter is raised by the movement of the bar E⁴, and close the open slot in the bill, so as to prevent the cord from passing down through the said slot instead of passing over the same and under the grasper X². As the set-screw q, which is firmly held in the sleeve Z³, passes through the inclined slot in the shaft Y', and is firmly secured in shank of the grasper, it follows that as the sleeve with its connected bridge is moved upward by the bell-crank lever B³ it also carries with it the grasper, and as the screw q passes through the inclined slot in the shaft Y' the upward movement is also converted into a partial rotary movement.

As the bridge and grasper before referred to are rigidly secured together and move simultaneously, it will be seen that when the bridge is at its highest point the open slot is covered and the grasper is elevated for the passage of the cord under the same, and when the grasper is lowered onto the cord the bridge also falls; but during the fall the partly rotary movement imparted thereto turns it from under the open slot in the bill, so as to enable the needle to pass for the next bundle.

The top face of the box $W'$ is provided with an open slot, $C^4$, one end of which is beveled and provided with a cutting-knife, $C^5$. This top face is also provided with means for attachment to the needle-carrier, with an opening for the passage of the sleeve and tying-bill, and with a stationary jaw, $D^5$, on its top face, which forms a portion of the cord-holder. Beneath this top face-plate of the box $W'$ is a sliding plate, $F^4$, loosely secured to the said top plate in any suitable manner, and provided with a cording-holding jaw, $D^6$, curved and shaped, as shown, so as to extend above the plate $W'$, and with the cutting-knife $C^6$, extending beneath the plate, beveled in the opposite direction to the knife $C^5$, and adapted to operate, in connection therewith, with an oblong opening, through which the sleeve $Z^3$, with its contained parts, passes, and with the rigid bar $E^4$, having the open slot $E^5$ therein, in which the curved arm $a'$ of the bell-crank $B^3$ rests and moves. This slot $E^5$ is provided at one extremity with an upward continuation, into which the arm $a'$ is forced as the bar $E^4$ is moved. This upward continuation or enlargement of this slot is made curved so as to enable the arm to easily enter and pass therefrom without hitch during the operation of the machine. While the arm $a'$ rests in the main portion of the slot $E^5$ the said arm remains stationary, but when the end thereof is reached the wall $a^2$ strikes the arm $a'$ and forces it up into the upward continuation of the slot $E^5$. This upward movement of the arm $a'$ also moves the bell-crank, of which it forms a part, which in turn moves the sleeve, with its attached bridge, and the latter, through the intervention of the set-screw $q$, moves the shaft $Y^3$ and the grasper, and enables them to perform the movements before described. This sliding plate $F^4$ is also provided with a second cord-holding jaw, $G^4$, below the cutters, adapted to act in conjunction with the grooved guide $G^5$. The function of this holder is to hold the end of the cord leading from the spool after the gavel has been ejected from the machine. This movable jaw $G^4$, the movable cutting-knives, and the cord-holding jaw above the top face of the box $W'$ are situated in the same vertical plane, while the stationary jaws and cutter are also situated in the same vertical plane, and as the movable portions all move simultaneously an open space of sufficient width is formed for the passage of the needle up and down to carry up and return the cord when the latter has been passed over the gavel.

The movable jaw $G^4$, as before stated, moves in the grooved guide $G^5$, the latter being bolted directly to the under side of the face-plate of the box $W'$. This jaw $G^4$ is provided with a side flange, $b'$, which, together with the curved front edge of the same, operates to direct the cord in position between the jaw $G^4$ and the grooved guide $G^5$. The front face or edge of the jaw is provided with a V-shaped notch, $e'$, under which the cord passes, the hook made by this notch catching the cord and drawing it back with the jaw $G^4$ when the latter is moved to an open position. Thus the cord, being between said jaw and the guide $G^5$, will be securely clamped. The grooved guide $G^5$ is slightly cut away at its inner end, as shown at $c'$, so as to enable the cord to pass under the guide and enter the V-shaped slot therein without cutting the cord.

The cutting mechanism and the mechanism for operating the grasper and bridge of the tying-bill are, as before stated, connected to and operated by the lever $H^4$, which latter is fulcrumed to the top plate of the box $W'$. This lever $H^4$ is connected between its two ends to the movable plate $F^4$, and is provided with upwardly-turned ends adapted to be engaged alternately with projections which operate the several parts simultaneously. This lever $H^4$ is so arranged that when the needle-carrier carries the knot-tying mechanism toward the ground-wheel the upwardly-projecting end $f^2$ thereof (see Fig. 6) will strike the stop $g'$, which opens the cord holding and cutting jaws, and turns the bridge from under the slot in the tying-bill and lowers the grasper onto the said tying-bill. The needle is then supposed to be in an elevated position, and is carried over the gavel, and then descends. As the needle is carried over the gavel the box $W'$ is also carried to the inner end of the slot $I'$, during which passage the other upwardly-extending arm, $f^3$, of the lever $H^4$ has passed over a spring, $H^5$, fastened to the bottom of the table $H$ in the path of the lever $H^4$, and depressed the same. As the arm passes beyond the said spring it (the spring) resumes its normal position and forms a stop or check to the return of the said arm. The inner end of this spring $H^5$ is rounded, and as the needle-carrier again moves toward the ground-wheel the rounded or curved end of this spring $H^5$ engages the rear arm of the lever $H^4$, and holds the same while the other parts continue their movements. This closes the grasper and cutter-jaws, and elevates the bridge $X^3$ and the grasper $X^2$ to their highest positions. When the arm $f^2$ of the lever $H^4$ strikes the stop $g'$ it moves the lever in the opposite direction and closes the parts, as before stated.

From the foregoing it will be seen that all the movements in this last-described mechanism are obtained while the box $W'$ is moving toward the ground-wheel, and the parts are at rest while moving toward the center of the table.

The mechanism for operating the revolving tying bill $X'$ consists of the pinion $Y^2$, secured on the shaft $Y'$, and the segment-rack $Z^4$, placed in a position to register therewith at the proper time. This rack $Z^4$ is secured in any suitable manner below the table $H$, and is formed in the arc of a circle concentric with the axis of the needle-carrying lever. The pinion Y² is provided with a hub, Z², a portion of which is cut away, as shown at a³, so as to enable the pinion to slide along a portion of the rack not provided with teeth, and thereby hold the same in a locked position, which prevents it from turning. This rack Z⁴ is provided with just enough teeth to turn the pinion once at each outstroke, as that is all that is required to tie the knot. The teeth in the rack are arranged near the center thereof, so that there will be a plain portion on both sides. At the commencement of the stroke, or during that portion of the operation at which the needle-carrier, with its needle and tying mechanism, starts from the inner end of the slot I to move outward, the cut-away portion of the hub bears against the plain face of the rack until the point is reached when the tyer should begin to revolve. At this instant the teeth of the segment engage the teeth of the rack and revolve the tyer once, when the plain portion of the hub again meets the opposite plain portion of the rack and holds the tyer immovable on its own axis. When the needle-carrier again starts back the plain portion of the wheel bearing against the plain portion of the rack still holds the tyer locked until the teeth are reached, when the tyer is revolved in the opposite direction, which places the parts in position for another bundle.

The operation of the harvester and binder is as follows: As the machine is moved forward the knives cut the grain, which falls on the table H, with the heads thereof toward or on the shield, and it is carried from thence under the spring compressor-arm H'. At this stage of proceeding the needle is elevated over the outer end of the slot I', and the end of the cord is held between the movable jaw G⁴ and the grooved guide G⁵. The grain presses on the cord and becomes firmly impacted against the same, and the needle is caused to move over the grain toward the center of the table, and then downward and carry the cord between the cord-holders, the severing-knives, and the cord-holder and grooved guide. The needle-carrier, with the needle and tying mechanism, is now moving outward toward the ground-wheel C, during which movement the pinion Y² engages the segment-rack Z⁴ and ties the knot. While the knot is being tied the rear arm of the lever H⁴ engages the spring H⁵, which closes the holding-jaws D⁵, D⁶, G⁴, and G⁵ and cutting-knives C⁵ C⁶, and severs the cord. Now, the ends of the cord around the gavel are held by holders D⁵ D⁶ above the cutting-knives, while the end of the cord for the next gavel is held by the grasper or holder G⁴ in the grooved guide G⁵ below the cutters. Just before the finish of the outward movement of the needle-carrier the front arm of the arm H⁴ abuts against the stop g', which opens the graspers and cutters and allows the gavel to be ejected from the machine. The construction of the holder and grooved guide is such that the cord is only firmly held therein when the parts are in open position, and hence while the parts are in position for the next descent of the needle the end of the cord is firmly held against displacement.

My machine is comparatively simple in construction, is durable and effective in use, and can be manufactured at a cost greatly less than the machines as at present constructed. I would have it understood that I do not limit myself to the precise construction and arrangement of parts shown and described, as there are many changes that could be made therein without departing from the spirit of my invention; and hence I would have it understood that I consider myself at liberty to make such changes as come within the spirit and scope of my invention.

Having fully described my invention, what I claim as new, and desire to secure by Letters Patent, is—

1. In a harvester, the combination, with a draft-tongue having an open frame secured thereto at its rear end, of a ground-wheel journaled in the said frame, means for adjustably connecting the said frame to the harvester-table, and a diagonal brace rigidly secured at one end to the table, and secured to the tongue at the opposite end by suitable connections, so as to allow a slight movement of the brace, substantially as set forth.

2. The combination, with the tongue and ground-wheel, of a diagonal brace, one end of which is rigidly secured to the harvester table, while the opposite end thereof rests over an oblong slot in the tongue, and a whiffletree-bolt for connecting the said brace to the said tongue, substantially as set forth.

3. In a harvester, the combination, with a draft-tongue having a frame secured to the rear end thereof, which latter is adapted to embrace the ground-wheel, of a step provided at one end with a slotted arm working over a stud on the frame, and at the opposite end with an arm passing through a guide of the frame, and connected to the table by means of a cross-bar, and levers for elevating, lowering, and inclining the said platform.

4. The combination, with the revolving driving-shaft having a sprocket or pulley wheel thereon, of a combined pulley and mutilated gear wheel secured to the under side of the table, and connected to the said pulley or sprocket wheel by suitable connections, and adapted to operate the rake and binding mechanisms.

5. The combination, with the grain-table, of an endless chain provided with rakes and working on suitable pulleys or sprocket-wheels, and a pinion secured upon the lower end of one of said pulleys and adapted to engage a mutilated gear-wheel, substantially as set forth.

6. The combination, with two horizontal pulleys situated a suitable distance apart on the top of the table, of a drive-chain adapted to be moved around said pulleys by means of a mutilated gear-wheel and pinion arranged below the table, and provided with rakes and a shield covering said pulleys and chain, substantially as set forth.

7. The combination, with the rake-chain made in two or more separate pieces, of rakes, each bent to form a loop to connect the sections of the chain, substantially as set forth.

8. The combination, with the endless carrier provided with rakes, as described, of a needle-carrier adapted to act in conjunction with the rakes, and mechanism arranged below the table and adapted to operate said rakes and carrier, and a needle-operating lever by means of which the needle is vertically reciprocated, substantially as set forth.

9. The combination, with a needle-carrier constructed as described, and suitably journalled in bearings of the grain-table and operating-stand, of a needle-operating lever pivotally supported upon the needle-carrier and adapted to vertically reciprocate the needle, substantially as set forth.

10. The combination, with a needle-carrying arm, a needle-operating lever, and needle operating stand, the latter constructed and provided with the parts as described, and suitable tying mechanism, of means for imparting the desired movement to the needle-operating lever.

11. In combination with a box, W', having a rigid cutter, $C^5$, a rigid cord-holding jaw, $D^5$, and a grooved guide, $G^5$, adapted to act in conjunction with a sliding plate, $F^4$, having a cord-holder, $G^4$, rigidly secured thereto, a holding-jaw, $D^6$, and a cutter, $C^6$, all of the above parts being adapted by suitable mechanism to be separated and brought together, as described, so as to enable the needle to pass through and leave the cord between them in its proper position to be grasped by the knotter.

12. The combination, with the revolving tying-bill constructed as described, of a grasper located above the bill and a bridge located below the bill, said grasper and bridge being adapted to be elevated for allowing the cord to pass under the grasper, and for preventing it from passing through the open slot of the bill before it reaches the grasper, substantially as set forth.

13. The combination, with the tying-bill constructed substantially as described, of a grasper the shank of which rests in the shaft of the tying-bill, and a bridge the body or sleeve of which embraces a portion of the tying-bill shaft, the said sleeve and shank being connected together by a pin passing through an inclined slot in the shaft, and means for elevating and lowering the bridge and grasper at the proper times, substantially as set forth.

14. The combination, with a revolving knotter, of cord-holders situated above the severing-knives, and adapted to hold the ends of the cord which have been severed from the remaining portion thereof, and the guide $G^5$, and sliding jaw $G^4$ below the knives, and adapted to hold the end of the cord down in position for the next bundle.

15. The combination, with the face-plate of the box having the grasping-jaw, grooved guide, and knife, and the sliding plate with its holding-jaws and knife, of a lever pivoted to the face-plate of the box, and pivotally secured to the sliding plate and adapted to engage with stops during its movements, and separate and close the cord-holders and knives.

16. The combination, with the face-plate of the box and the sliding plate, the latter being constructed and provided with the parts described, of a lever pivotally secured to the said parts, and adapted to engage a rigid stop and a movable stop, substantially as described, and reciprocate the said sliding plates.

17. The combination, with the tying-bill, grasper, sleeve or body, and bridge, of a bell-crank lever adapted to elevate and lower the said grasper and bridge at certain intervals.

18. The combination, with a sliding plate having a bar thereon, provided with a slot, as described, of the tying-bill, grasper-ferrule, and bridge, and a bell-crank, the arm of which latter rests in the slot in the bar and operates to elevate and lower the grasper and bridge.

In testimony that I claim the foregoing I have hereunto set my hand.

ALVIN O. CARMAN.

Witnesses:
HERMAN MORAM,
S. G. NOTTINGHAM.